June 12, 1923.
H. REEVES ET AL
AUTOMOBILE LOCK
Filed Nov. 26, 1919
1,458,244
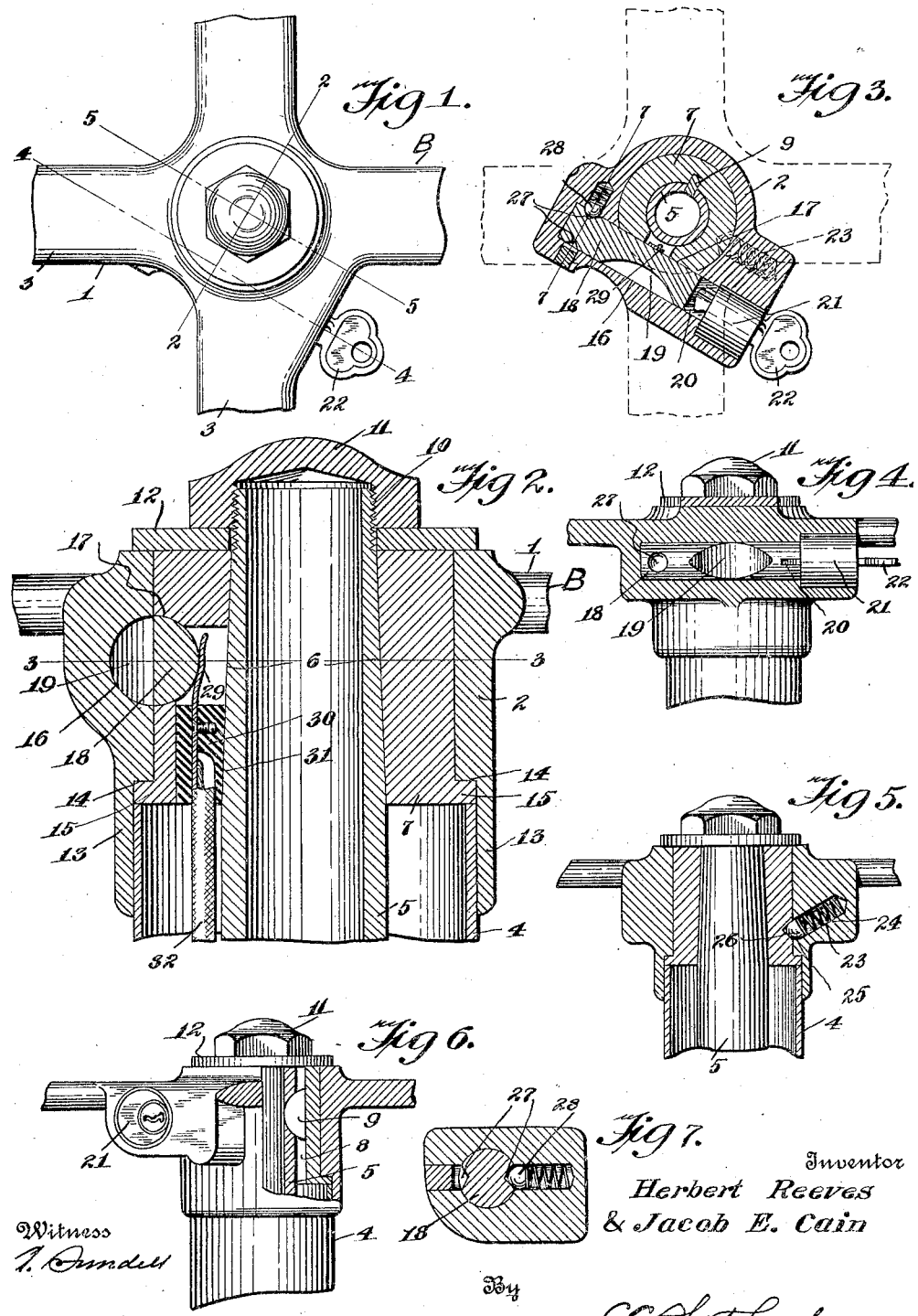
Witness
T. Arndell
Inventor
Herbert Reeves
& Jacob E. Cain
By
C. C. Shepherd Attorney Patented June 12, 1923.

1,458,244

UNITED STATES PATENT OFFICE.

HERBERT REEVES AND JACOB E. CAIN, OF COLUMBUS, OHIO, ASSIGNORS OF ONE-HALF TO SAMUEL D. HEARING AND HERSHEL W. UNKEL, BOTH OF ZANESVILLE, OHIO.

AUTOMOBILE LOCK.

Application filed November 26, 1919. Serial No. 340,732.

*To all whom it may concern:*

Be it known that HERBERT REEVES and JACOB E. CAIN, citizens of the United States, residing at Columbus, in the county of Franklin and State of Ohio, have invented certain new and useful Improvements in Automobile Locks, of which the following is a specification.

This invention relates broadly to an improved automobile lock, and has particular reference to a lock so constructed as to permit under certain circumstances of the free and independent rotation of a steering wheel with respect to its associated steering column, in order that by rendering the operation of the wheel independent of the steering column, successful operation of an automobile under predetermined circumstances will be precluded.

The invention accordingly consists in the provision of a steering member and an axially mounted steering wheel, said wheel and member being provided with registerable openings in which is rotatably mounted a key element, said key element being provided centrally with a recess which is of a configuration corresponding to that of the peripheral formation of the steering member, whereby when said recess is positioned so as to be in registration with said steering member, said wheel may be loosely rotated in an independent manner about and with regard to said steering member and, conversely, when said key element is rotated so that the recess thereof will be out of registration with said steering member, said wheel and steering member will be locked together for unitary movement.

Another object of the invention resides in the provision of automatically operated means mounted in connection with said steering wheel and member and operating to notify the manipulator of the wheel when the element receiving openings are in or out of relative registration. Similarly, the invention further provides means for denoting by the sense of touch when the key element is in or out of registration with the steering member.

A further object of the invention resides in the provision of an improved switch structure which is carried within the steering column and located in cooperation with said key element, whereby when said key element is so positioned as to lock the steering wheel to the steering member, said switch structure will be closed to complete an electrical circuit, and reciprocally, when said key element is so positioned as to permit of the free rotation of the steering wheel in a manner independent of said steering member, said switch structure will be operated to open said circuit. The invention thus combining both a mechanical and an electrical lock for motor vehicles.

With these and other objects in view, as will appear as the description proceeds, the invention further consists in the novel features of construction, combinations of elements, and arrangements of parts hereinafter to be fully described and to have the scope thereof pointed out in the claims hereunto appended.

In the accompanying drawing, forming a part of this specification and in which similar characters of reference denote like and corresponding parts:

Figure 1 is a fragmentary plan view of a steering wheel and column constructed to embody the locking features constituting the present invention.

Figure 2 is a vertical sectional view taken along the plane disclosed by the line 2—2 of Figure 1.

Figure 3 is a horizontal sectional view taken through the locking mechanism on the plane disclosed by the line 3—3 of Figure 2.

Figure 4 is a vertical sectional view taken through the key element and its cooperative mechanism, the plane of which being indicated by the line 4—4 of Figure 1.

Figure 5 is a similar view taken on the line 5—5 of Figure 1.

Figure 6 is a side elevation of the steering wheel, portions of which being shown in section to disclose the underlying structure.

Figure 7 is a detailed sectional view taken along the line 7—7 of Figure 3.

Referring more particularly to the structural details of the invention, the numeral 1 designates a steering wheel of the type commonly employed in connection with the steering gear of a motor vehicle. This wheel embodies the usual hub portion 2, and radially extending spokes 3. The wheel 1 is adapted to be connected, in a manner to be hereinafter particularly described, with the upper end of a steering column B, in order that the rotation of the wheel may suitably rotate said steering column to effect corresponding movement on the part of the steering wheels (not shown), of a motor vehicle. The steering column B consists in this instance of a thin outer metallic shell 4, and an inner rotatable member 5. This member extends axially with respect to the hub of the wheel 1 and is tapered as shown at 6 to receive a collar 7, the latter, as shown, is of a size capable of snugly fitting within the bore of the hub 2. The member 5 and the collar 7 are in fact a unit and are capable of rotating in unison. This may be accomplished, as is best shown in Figures 3 and 6, by providing the collar 7 with a vertically extending slot 8 in which a feather 9 is situated, the latter being also suitably received within an opening formed in the member 5, whereby the rotation of said member will be accompanied by similar movement on the part of said collar. The extreme upper end of the member 5 is threaded as at 10 for the reception of a binding nut 11. This nut is so disposed as to engage with a washer 12, which overlies the collar 7 and the hub or the wheel 1, whereby said wheel may be rotatably retained in its operative position upon the steering column. If desired, the hub portion 2 of said wheel may be provided with a downwardly extending tubular portion 13, which is of such length as to overlie and conceal the joints existing between the lower edges of the collar 7 and the upper end of the shell 4. Also, said tubular portion is provided with an inwardly located and annular shoulder 14, which is disposed to rest upon an annular flange 15 provided upon the lower end of the collar 7. Obviously, by being confined between the washer 12 and the flange 15, said wheel will be rotatably supported in connection with the steering column.

Ordinarily, it is the common practice to key or otherwise secure the wheel 1 to the upper end of the rotatable member 5, in order that the rotation of the steering wheel may effect the operation of an associated steering gear. However, the present invention practically comprehends means whereby said steering wheel may be disconnected, at the will of the operator, from said steering member, in order that the rotation of said wheel will not always be capable of operating the member 5 and in this manner to protect a motor vehicle against surreptitious use or theft. To accomplish this end, the hub portion 2 is provided with a transversely extending socket 16, which is located on a plane substantially at right angles to the major axis of the steering member 5, and said spoke is so formed as to be intersected by the collar 7. The collar 7 is, in turn, provided with an arcuate opening or groove 17 in its periphery, which opening is of such form and dimensions as to be capable of aligning itself with and forming a continuation of the socket 16, as is best shown in Figure 3. Arranged to be rotatably received within the socket 16 and also the opening 17 is a key element 18 which is of elongated rod-like formation. The key element is provided centrally with an arcuate recess 19, which is of a shape and size corresponding to that of the perimeter of the collar 7. By virtue of this construction, it will be manifest that when the key element is so revolved, its recess 19 will be out of registration with the collar 7, or its opening 17, a portion of said key element will extend through the opening 17 in the manner shown in Figure 3. When thus positioned, the key element serves to rotatably unite the steering wheel 1 with the steering member 5 and consequently, movement on the part of said steering wheel will be accordingly imparted to the steering member. However, by reversing the position of the key element, its arcuate opening 17 may be brought into registration with the circumference of the collar 7, and when thus positioned, said key element will be independent of said collar and will in no wise control its movements. When in this latter position, the steering wheel may be loosely rotated without in any way imparting motion to the steering column, thus rendering the operation of a motor vehicle impracticable and accordingly minimizing the danger of theft.

To guard said key element and to prevent its surreptitious actuation, the end of said key element is bifurcated as at 20 and is located contiguous to a key actuated tumbler lock mechanism 21. This mechanism is situated in the outer end of the socket 16 and is securely retained in such position through any suitable agency. Obviously, by the use of a key 22 fitted to such mechanism, the key element 18 may be rotated so that the position of its recess 19 may be regulated. It is of course to be understood that the form of mechanism 21 may be varied, as in certain embodiments of our invention, we may employ a combination lock for effecting the actuation of the key element, and it is obvious that this latter form may operate with the same efficiency and surety as the form of lock mechanism described.

In order to notify the operator of the wheel 1 when the key element is in a position of registration with the opening 17, the hub portion 2 is provided with an internally bored opening 23, in which is situated a coil spring 24, the latter operates upon a ball 25, which is adapted to be seated within a conical opening 26 provided in the periphery of the collar 7. It will be manifest that when the ball 25 is forced into the opening 26 by the spring 24, the rotation of the wheel 1 will be arrested to a certain extent, and this stoppage of movement will serve to notify the operator of the registration between said key element and the collar 7. This construction is employed in order that the parts of the device may be rapidly aligned and that but a minimum of time will be lost in effecting the actuation of the locking mechanism.

In furtherance of this principle, the inner end of the key element, which is situated in the closed end of the socket 16, is provided with a plurality of conical openings 27. These openings are adapted to receive a spring pressed ball 28 formed in the hub portion 2. This construction is such that when the key element is rotated so as to be in proper alignment with the opening 17, the movement of the key element will be limited, or momentarily arrested as in the case of the rotation of the steering wheel about the collar 7. By the provision of the ball 28, the operator is instantly notified as to the relationship between parts and hence no time will be lost in effecting the desired registration thereof.

From the foregoing description, taken in connection with the accompanying sheet of drawing, it will be seen that there is provided mechanism whereby an automobile may be effectively locked in such manner that its unauthorized use will be rendered extremely unlikely. When the parts are in locked relation, the steering wheel may be loosely rotated about the steering column and consequently it will be impossible to effect controlled movement on the part of the steering gear of the vehicle. The parts of the lock are all substantially enhoused, and the operation thereof can only be effected by the provision of a key particularly designed for the lock 21, or by possessing the required combination thereof. Not only does the invention provide a mechanical lock, but the same also includes means for controlling the ignition circuit of the vehicle. In the present instance, this means has been illustrated as consisting of a contact strip 29, which is mounted upon a suitable block of insulation 30 located within a vertically disposed opening 31 formed in the collar 7. This strip 29 is connected by means of a suitable wire 32 with any suitable source of current supply. The upper end of the strip 31 is so disposed that when the key element is in the position occupying the opening 17, said key element will engage the strip 29 and thus complete a grounded circuit. On the contrary, when the wheel 1 is permitted to loosely rotate about the steering column, said key element will occupy a position independent of the strip 29, thus causing an open circuit.

We claim:

1. A vehicle lock comprising, in combination, a collar fixed to the upper end of a steering post structure, said collar being provided with a tangential recess, a steering wheel capable of loosely rotating about said collar and provided with a transverse socket capable of registering with said recess, a cylindrical locking element situated and rotatable axially within said socket, said element being provided with an arcuate recess substantially corresponding to the circumferential formation of said collar, lock mechanism directly coupling with said element and located on a plane substantially at right angles to the longitudinal axis of said post structure, said lock mechanism permitting in itself of the positive and direct rotation of said locking element so that the latter may be positioned within the recess of said collar to lock the latter and said steering wheel together for simultaneous rotation and to also permit said element to be adjusted so that its arcuate recess will lie in circumferential registration with said collar, whereby said wheel may be rotated independently of the collar and steering post structure, and a circuit governing member positioned within the recess formed in said collar and capable of engaging with said locking element, when the latter operates to connect the wheel with the steering post structure to govern an electrical circuit.

2. A vehicle lock comprising, in combination, an annular member adapted to be fixed upon the upper portion of the steering post structure of a motor vehicle, said member being provided with a tangential groove, a steering wheel axially rotatable about said member, said wheel having its hub portion provided with a socket disposed for registration with said groove, the longitudinal axis of said socket being disposed at right angles to the major axis of the post structure, a cylindrical locking element extending longitudinally of said socket and mounted for rotation therein, said element being provided with a recess shaped to conform with the peripheral formation of said member, whereby when said element occupies an inactive position the same will be independent of said member but when in an active position the said element will be disposed within the groove of said member, and key actuated locking mechanism disposed in the outer end of said socket and capable of directly and positively effecting the rotation of said element.

3. A vehicle steering wheel lock comprising, in combination, an annular member adapted to be fixed upon the upper portion of the steering post structure of a motor vehicle, said member having its periphery provided with a tangentially disposed groove, a steering wheel mounted for rotation about said member, the hub of said member being formed to include a socket having its longitudinal axis disposed to extend at right angles to the major axis of the post structure, said socket being formed for registration with the groove in said member, whereby when in registration said socket and groove will serve to define a true cylindrical port, a locking element positioned within said socket and adapted for rotation therein, said element being provided with an arcuate recess corresponding substantially to the peripheral contour of said member, whereby said element by rotation may be moved to assume locking or unlocking positions within the wheel, resilient means for maintaining said element in its operating positions, and a key actuated locking mechanism for effecting the rotation of said element, said mechanism being situated in the outer end of said socket.

In testimony whereof we affix our signatures.

HERBERT REEVES.
JACOB E. CAIN.